United States Patent Office 3,098,098
Patented July 16, 1963

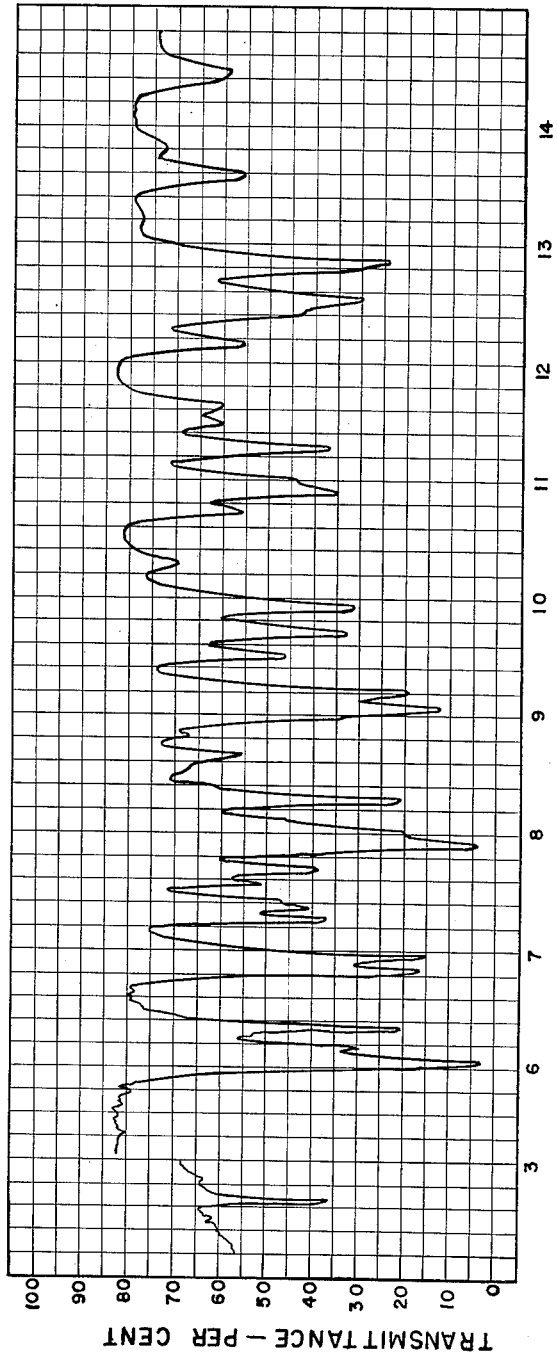

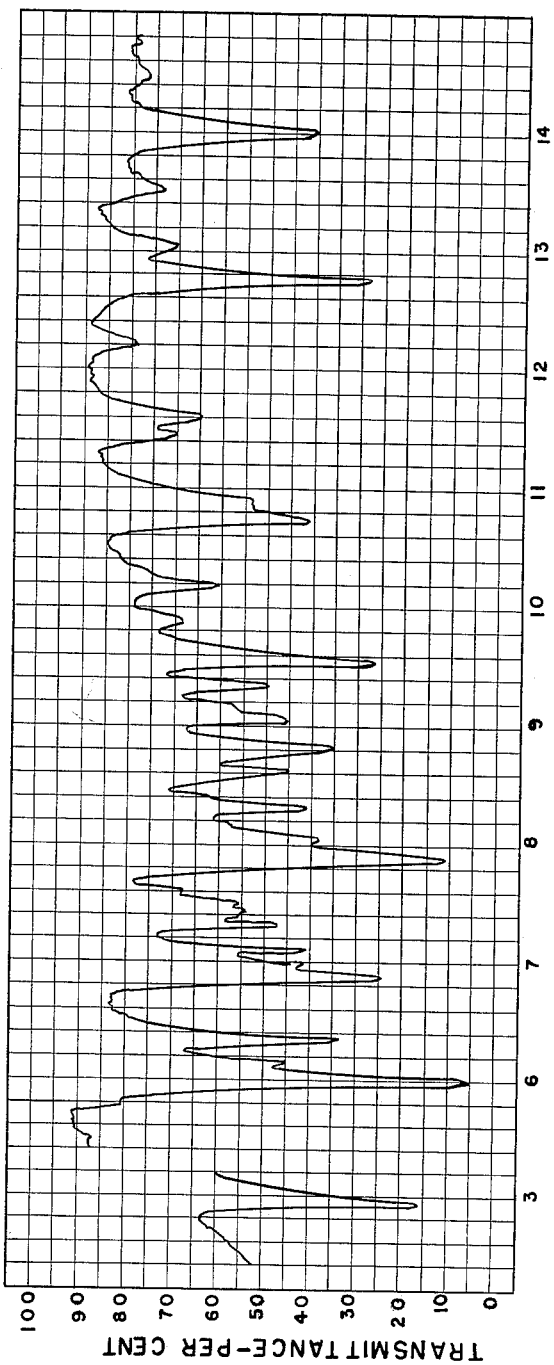

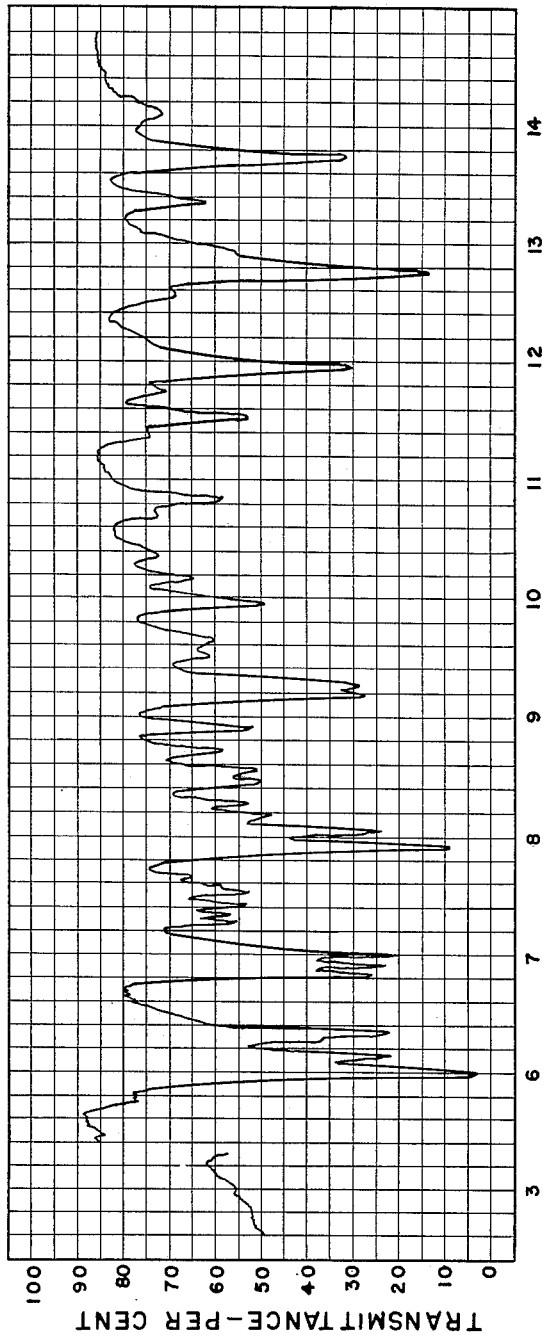

3,098,098
METHOXYTETRALONE TETRACYCLIC ADDITION PRODUCTS
John A. Cella, Lake Forest, Ill., assignor to G. D. Searle & Co., Chicago, Ill., a corporation of Delaware
Filed Apr. 21, 1960, Ser. No. 23,851
4 Claims. (Cl. 260—586)

The present invention relates to certain compounds obtainable by the interaction of 5-methoxy-2-tetralone and an alkyl vinyl ketone or the equivalent thereof. It is known in the art to react 5-methoxy-2-tetralone with 1-diethylamino-3-pentanone methiodide in the presence of sodium methoxide and produce a tricyclic compound of the formula

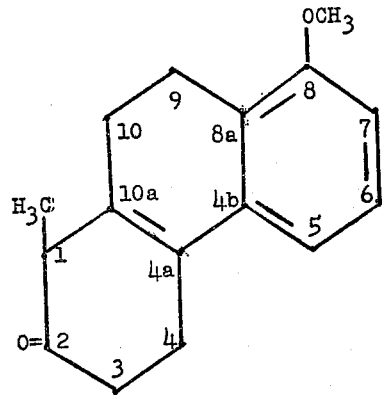

(I)

which, in turn, is reacted with methyl vinyl ketone, again using sodium methoxide as a condensing agent, to produce a tetracyclic compound of the formula

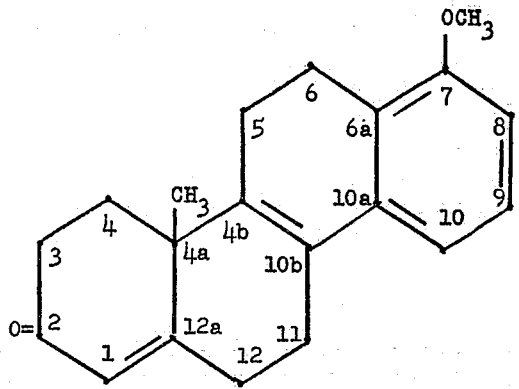

(II)

The preparation of compounds I and II as described is reported by William S. Johnson and co-workers in J. Amer. Chem. Soc., 75, 2275 (1953). Compound I, which is 1,2,3,4,9,10-hexahydro-8-methoxy-1-methyl-2-oxophenanthrene, is characterized by Johnson et al. as melting at 96.5–97° centigrade and analyzing 78.94% carbon and 7.55% hydrogen. Compound II, which is 7-methoxy-4a-methyl-2,3,4,4a,5,6,11,12-octahydro-2-oxochrysene, is characterized as melting at 174.2–175° centigrade and analyzing 81.48% carbon and 7.61% hydrogen. The two compounds serve as intermediates in the total synthesis of certain steroid hormones. They are apparently devoid of hormonal activity themselves.

The general method for converting a cyclic ketone into an unsaturated cyclic ketone containing one additional hydroaromatic ring—of which method the foregoing preparation is a specific example—was originally developed by Sir Robert Robinson and co-workers [cf. Du Feu, McQuillin, and Robinson, J. Chem. Soc., 1937, 53] who treated the sodium enolate of a cyclic ketone or of its carbethoxy derivatives—specifically, 2-carbethoxycyclohexanone—with the methiodide of a Mannich base such as 1-diethylaminobutanone-3 to produce 4a-carbethoxy-2,3,4,4a,5,6,7,8-octahydro-2-oxonaphthalene. The Mannich base acts as a source of alkyl vinyl ketone for Michael addition, which is followed by cyclization. The method has been variously applied and improved in the period since its conception [see, for example, A. L. Wilds and C. H. Shwenk, J. Amer. Chem. Soc., 65, 469 (1943); and Cornforth and Robinson, J. Chem. Soc., 1946, 676, and 1949, 1855] and has become a well and widely known tool in the field of organic synthesis, particularly for the preparation of steroid intermediates.

Against this background of accepted knowledge, I have discovered, surprisingly, that 5-methoxy-2-tetralone can be reacted with an alkyl vinyl ketone in the presence of a Michael addition catalyst to produce materials which differ both in structure and in properties from anything foreshadowed by the prior art.

I have found, for example, that 5-methoxy-2-tetralone and methyl vinyl ketone, reacted together at temperatures in the neighborhood of 25° centigrade for as long as 20 hours, using sodium methoxide as a catalyst and methyl alcohol as solvent, yield a compound (III) melting at 224–225° centigrade, analysis of which shows 76.67% carbon and 7.43% hydrogen, and a second compound (IV) melting at 198–201° centigrade, analysis of which shows 76.48% carbon and 7.38% hydrogen, both compounds being thus distinguished from other products of the same reaction, namely, 1,2,3,4,9,10-hexahydro-8-methoxy-2-oxophenanthrene, having the formula

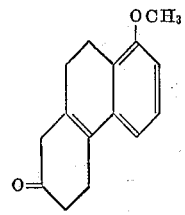

(V)

and 7-methoxy-2,3,4,4a,5,6,11,12-octahydro-2-oxochrysene, having the formula

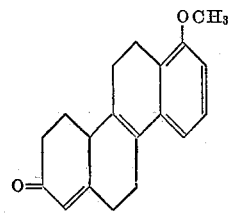

(VI)

which latter products (V and VI) have been isolated by me from the reaction mixture and found to be defined as follows: compound V melts at 109–112° centigrade and shows a carbon-hydrogen content of 78.94 and 6.96%, respectively; compound VI melts at 164–165° centigrade and analyzes 81.35% carbon and 7.14% hydrogen.

Still another product of the foregoing reaction between 5-methoxy-2-tetralone and methyl vinyl ketone which I have isolated is 2,3,4,4a,9,10-hexahydro-8-methoxy-2-oxo-phenanthrene, having the formula

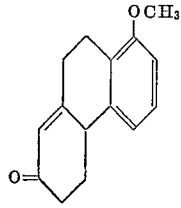

(VII)

This material (VII) shows a melting point of 120–122° centigrade and has a carbon-hydrogen content of 79.14 and 7.38%, respectively.

Compounds V and VII apparently represent alternative dehydrations of the presumed intermediate alcohol

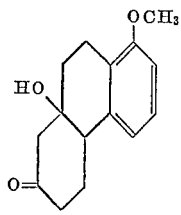

(VIII)

formed in the process of ring closure of the Michael addition product preliminarily obtained in the subject reaction. In accordance with this concept, further, dehydration may involve either the hydrogen at carbon number 4a—which is activated by the benzene ring—or it may involve one of the two hydrogens of carbon number 1—both of which are activated by the carbonyl group. Elements of water are split out and, depending on which of the activated hydrogens is thereby eliminated, one or both of the two olefins (V and VII) result. The relative proportion of the two olefins obtained is determined by the stereochemical configuration of the alcohol (VIII)—with reference, in particular, to provision for the trans elimination of water—and by the relative magnitude of the resonance stabilization energy of the double bond as it is positioned in each of the two products (V and VII), respectively.

Compounds III and IV of this invention are thought to eventuate as a result of the addition of two methyl vinyl ketone aggregates at the activated (1) methylene group of methoxytetralone, for example, thus

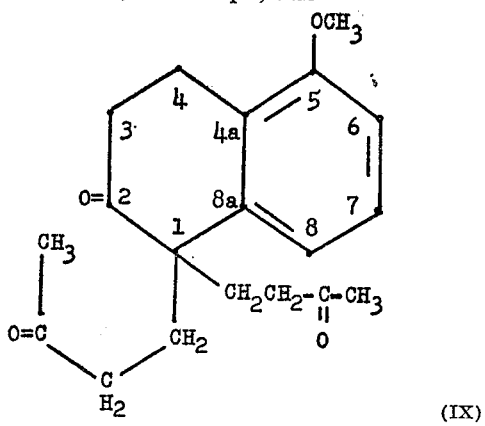

(IX)

in contrast to the conventional single additions taught by the prior art in this field. Further, one of these addenda is believed to be cyclized through the oxygen at carbon number 2 of the tetralone nucleus (carbon number 10a in phenanthrene), whereas the second addendum is postulated as participating in ring closure at carbon number 3 of the phenanthrene nucleus. If such is indeed the construction of compounds III and IV, they would presumably be represented by the formula

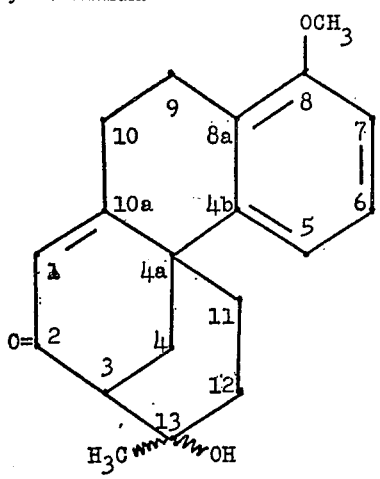

one compound being identified with the "α" configuration of the hydroxyl at carbon number 13, the other with the "β" configuration thereat.

Alternatively, closure of the second methyl vinyl ketone addendum could conceivably have occurred through carbon number 10 of the phenanthrene nucleus, in which case compounds III and IV would have the formula

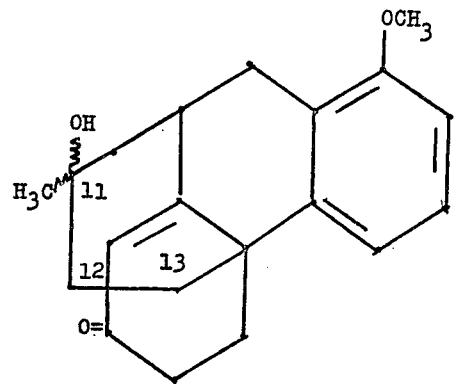

the stereoisomeric relationship of the two compounds above contemplated here centering about the carbon numbered 11.

It will be appreciated that the foregoing discussion of certain formulas thought to be appropriate to that which is known about compounds III and IV of this invention does not, nor is it intended to, amount to a definition of the said compounds in these terms. Rather, the purpose of this discussion in question is to derive and comment briefly upon at least some hypothetical structures which, in the present absence of evidence to the contrary, might conceivably account for the facts of the invention herein disclosed, namely, the preparation from known starting materials of specific new and different products possessed of unexpected useful properties.

Moreover, it will be apparent that the projected mechanism for addition of methyl vinyl ketone aggregates in the hypothetical reaction described, particularly with respect to an order in which said aggregates may be thought of as attaching to the tetralone nucleus, is at most interpretative, and certainly never restricting. Thus whether the "second" postulated addition occurs substantially simultaneously with the "first," more or less immediately thereafter, or in actual fact not until the "first" addition product has cyclized, has no bearing on the real scope of the subject discovery. The substance of the present invention is wholly this: that I can react together 5-methoxy-2-tetralone and an alkyl vinyl ketone (such as methyl vinyl ketone) or the equivalent thereof, at ordinary temperatures (less than 35° centigrade) and in the presence of a catalyst selected from the group consisting of alkali metal alkoxides, metallic sodium and sodium amide (as for example, sodium methoxide), using as a reaction medium an inert liquid which has the property of dissolving the reactants (in one instance, methyl alcohol) to produce novel compositions (by way of illustration, compounds III and IV) demonstrably distinct from those of the prior art and unpredictedly useful.

In the hereinabove described example of one application of my invention, it has been pointed out that the disclosed products are inherently different, one from the other. The differences which obtain between compounds V, VI, and VII are, of course, apparent from their structural formulas. With respect to compounds III and IV, comprehended by the appended claims, such distinctions cannot be drawn because the structural formulas are not known with certainty. However, it will be observed that the melting points of compounds III and IV are distinctive within the area contemplated, being substantially higher than those of compounds V, VI, and VII. Moreover, mixed melting point data on the compounds involved corroborate the non-identities indicated, characteristic depressions being noted in every case. Still further confirming the individuality of the compounds of this invention as compared with other products of the subject reaction are the analytical results described above. It is to be remarked that the carbon-hydrogen content reported for compounds III and IV corresponds to an empirical formula of $C_{19}H_{22}O_3$, whereas compounds V and VII have the empirical formula $C_{15}H_{16}O_2$, and compound VI, $C_{19}H_{20}O_2$.

Apart from the foregoing physical and chemical attributes distinctive of the claimed compositions is the unexpected and valuable pharmacological activity characteristic thereof. This activity is entirely unpredicted in the teachings of the prior art.

A remarkable example of the aforesaid pharmacological utility of the compounds of this invention is demonstrated in their use as anti-inflammatory agents. For instance, the subject compounds are valued because of their ability to inhibit the hyperemia associated with certain types of inflammation of the iris. Moreover, they block the sympathetic ganglia, lower blood pressure, and exhibit lipodiatic and androgenic properties.

Compounds III and IV of this invention may be recognized, wherever they occur, not only by their characteristic melting points and elementary compositions—remarked above in connection with the differentiation between these compounds and other products (compounds V, VI, and VII) of the interaction between 5-methoxy-2-tetralone and methyl vinyl ketone—but also by their absorption spectra, as well as their solubility profiles. Thus, compound III shows characteristic ultraviolet absorption bands at 223 and 242 millimicrons when dissolved (1%) in methyl alcohol solution, and, incorporated in a potassium bromide disc, is characterized by infrared absorption peaks at 2.83, 6.04, 6.17, 6.35, 6.82, 6.95, 7.29, 7.35, 7.59, 7.69, 7.92, 8.01, 8.30, 8.65, 9.05, 9.20, 9.53, 9.71, 9.92, 10.30, 10.74, 10.90, 11.00, 11.28, 11.50, 11.63, 12.18, 12.56, 12.83, 13.59, 13.82, and 14.43 microns. Compound IV absorbs at 231 and 242 millimicrons in the ultraviolet region, methyl alcohol being the solvent, and displays infrared absorption peaks at 2.97, 6.00, 6.14, 6.35, 6.87, 6.99, 7.10, 7.31, 7.41, 7.51, 7.60, 7.88, 8.03, 8.33, 8.62, 9.06, 9.17, 9.58, 9.90, 10.20, 10.75, 10.85, 10.95, 11.43, 11.60, 12.21, 13.05, 13.50, 14.00, and 14.50 microns by the potassium bromide disc method. The complete infrared spectra for the two compounds are shown in FIGURES 1 and 2, respectively, of the drawings made a part of this specification.

Each of the compounds III and IV is readily soluble in such relatively non-polar solvents as benzene or toluene, as also in glacial acetic acid. On the other hand, the compounds are but slightly soluble, respectively, in ethyl acetate, methyl alcohol, or ethyl alcohol; and neither compound III nor compound IV is appreciably soluble in water, dilute aqueous mineral acid, dilute aqueous alkali, normal hexane, or—perhaps surprisingly—cyclohexane.

Still further distinguishing compounds III and IV of this invention from products of the prior art is their characteristic behaviour when heated—either or both—with a dehydrating agent such as potassium acid sulfate. After a brief period at elevated temperatures—for example 15 minutes at temperatures in the range from 190° to 300° centigrade—a product (X) is obtained which melts at 178–180° centigrade and analyzes 81.20% carbon and 7.05% hydrogen, said analysis corresponding to an empirical formula of $C_{19}H_{20}O_2$ and reflecting the loss of one molecule of water from the starting material. The substance (X) manifests a solubility profile substantially the same as that of compounds III and IV whence it is obtained, being readily soluble in benzene, toluene, or glacial acetic acid; slightly soluble in ethyl acetate, methyl alcohol, or ethyl alcohol; and practically insoluble in water, dilute aqueous mineral acid, dilute aqueous alkali, normal hexane, or cyclohexane. Moreover, compound X—interestingly enough—retains the pharmacological utility which characterizes its progenitors, being, for example, a markedly active anti-iritic agent.

In addition to the foregoing data which serve for the identification of compound X wherever it may be found, the substance is characterized by definitive absorption spectra as follows: In the ultraviolet region, a single band appears having a maximum at 230 millimicrons and a molecular extinction of 20,600, readings being taken on a 1% solution of the compound in methyl alcohol. Infrared observation of the compound incorporated in potassium bromide shows peaks at 6.00, 6.14, 6.30, 6.34, 6.84, 6.91, 7.00, 7.28, 7.32, 7.42, 7.53, 7.58, 7.65, 7.91, 8.04, 8.19, 8.29, 8.49, 8.56, 8.72, 8.91, 9.19, 9.28, 9.52, 9.68, 9.97, 10.18, 10.38, 10.72, 10.84, 11.39, 11.52, 11.75, 11.97, 12.58, 12.77, 13.36, 13.72, and 14.12 microns, the complete spectrum being reproduced at FIGURE 3 of the drawings herewith.

No attempt is made to assign a structural formula to X as of the moment, nor would such assignment appear to contribute materially to the means of distinguishing the material already at hand, namely, melting point, elementary composition, solubility profile, and absorption spectra. It might be remarked, however, without in any way delimiting or otherwise altering the scope of the subject invention, that should the structural formula postulated for compounds III and IV wherein closure of the presumed second methyl vinyl ketone addendum occurs through carbon number 3 of the phenanthrene nucleus involved prove correct, it is probable that compound X has the structural formula

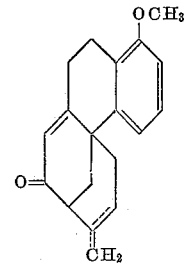

Similarly, should it eventuate that closure occurs in the subject compounds at carbon number 10 of the phenanthrene nucleus, then it seems likely that X has the formula

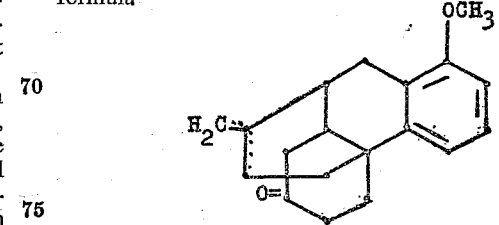

Returning yet again to compounds III and IV of this invention, still another aspect of their nature which I have noted is this: they may be degradatively dehydrogenated by conventional means—for example, with sodium borohydride in boiling alcohol, followed by 5% palladium on charcoal at 200–300° centigrade—to produce a known compound, namely, 1-methoxyphenanthrene, which melts at 100–102° centigrade and forms a picrate melting at 152–154° centigrade.

In the particular example of my invention hereinbefore described and discussed, the products disclosed—compounds III, IV, and X—result from the sodium methoxide catalyzed interaction of 5-methoxy-2-tetralone and methyl vinyl ketone at about 25° centigrade in methyl alcohol solution. I should like to make clear, however, that such is by no means the sole method of preparing the claimed compositions. Other reaction conditions, other catalysts, indeed, even other starting materials, may be used to effect the desired preparations.

Thus, for example, in synthesizing III and IV, the catalyst employed may be not merely sodium methoxide only, but rather a substance of the group comprising alkali metal alkoxides generally, metallic sodium and potassium, sodamide, and secondary amines such as piperidine, pyrrolidine, pipecoline, and the like, all of which have been found satisfactory in Michael addition of the type here contemplated. Reaction rates will vary, of course, depending on the catalyst selected; and when an amine is the catalyst of choice, it is oftimes necessary to employ forcing conditions, as for example, higher (reflux) temperatures and longer (up to 150 hours) reaction times.

Solubility of the reactants involved is the chief consideration in selecting reaction media for preparation of compounds III and IV. Methyl alcohol, ethyl alcohol, benzene, ether, and dioxane are all proven solvents for this type of reaction. Of these, the more polar materials are frequently preferred for the particular synthesis in question. When an alkali metal or sodamide is the catalyst, the reaction medium chosen should be, naturally, appropriate to the greater reactivity of these substances. Thus benzene or toluene, rather than an alcohol, is recommended for use with metallic sodium.

Temperatures used in the synthesis of compounds III and IV from methoxytetralone and methyl vinyl ketone are ordinarily kept below, say, 35° centigrade. However, higher temperatures are indicated when the catalyst employed is less active (as, for example, with piperidine). Since higher temperatures tend to promote undesirable side reactions, operations at, for example, reflux temperatures are commonly of shorter duration.

Reaction times for the particular reagents here under discussion may vary from as few as 6–8 hours to as many as 150 hours, depending on other factors (cf. the foregoing discussion of catalysts and temperatures), and it is generally well that an inert atmosphere be provided for the subject operations. Nitrogen serves admirably for the latter purpose; and among other advantages, appears to promote a better color in the products obtained.

As has been remarked above, not only the reaction conditions and the catalyst may be changed from those stipulated in the preparation of III and IV noted hereinbefore, but also even the principal starting materials may be different. It has already been indicated that so-called Mannich bases serve as a source of alkyl vinyl ketones in some instances, and such service avails for replacement of the methyl vinyl ketone of the subject preparation. Thus, 5-methoxy-2-tetralone may be reacted, not with methyl vinyl ketone, but with a 1-dialkylamino-3-butanone, for example 1-diethylamino-3-butanone, to produce the claimed compositions III and IV, reaction conditions and catalyst employed being in general those appropriate to the earlier described synthetic methods. Moreover, not only may there be substitution for the methyl vinyl ketone starting material; but instead of 5-methoxy-2-tetralone, 2,3,4,4a,9,10-hexahydro-8-methoxy-2-oxophenanthrene (compound VII) may be used as a progenitor of III and IV. Here again the reaction conditions and catalyst used are chosen according to the precepts laid down in the earlier described preparation.

It follows from the foregoing disclosure that my discovery of compounds III and IV contemplates their production by a variety of methods. For this reason, and also because the aforesaid compounds are, and have been shown to be, inherently distinguishable from products of the prior art quite apart from any single preparative procedure, it will be abundantly apparent that the present invention, insofar as it relates to III and IV, comprehends not only these very materials as they are derived by the interaction of 5-methoxy-2-tetralone and methyl vinyl ketone at about 25° centigrade in methyl alcohol solution, using sodium methoxide as a catalyst, but also all compounds identical therewith, whatever their method of production. By "identical" is meant possessed of substantially the hereinbefore prescribed physical, chemical, and therapeutic characteristics [of III and IV], i.e., demonstrably the same [as these], irrespective of the method(s) of production used.

Just as the compounds III and IV may be, and are, obtained in a variety of ways, so also is compound X of the hereinafter claimed compositions diversely derivable. The described conversion of III and/or IV through the agency of potassium acid sulfate stands as merely one example of dehydration techniques in general, particularly (presumably) as applied to tertiary alcohols. Equally satisfactory for reactions of this type are other quite disrelated procedures, as, for example, treatment with formic acid, phosphorous pentoxide, oxalic acid, or even acetyl chloride. It follows, therefore, that the present invention embraces compound X and every substance identical therewith, by whatever means produced, especially in view of the fact that X, like III and IV discussed above, is adequately distinguished physically, chemically, and with respect to its peculiar utility, from other products present in the art, and without recourse to any single method for its preparation.

The application for Letters Patent securing the invention herein described and claimed is a continuation-in-part of applicant's prior copending application Serial No. 452,192, filed August 25, 1954, and now abandoned.

The following examples describe in detail compounds illustrative of the present invention and methods which have been devised for their manufacture. However, the invention is not to be construed as limited thereby, either in spirit or in scope, since it will be apparent to those skilled in the art that many modifications, both of materials and of methods, may be practiced without departing from the purpose and intent of this disclosure. Throughout the examples hereinafter set forth, temperatures are given in degrees centigrade, pressures in millimeters of mercury, and relative amounts of materials in parts by weight, except as otherwise noted. Ultraviolet and infrared absorptions are expressed as wavelengths in millimicrons and microns respectively.

*Example 1*

To a solution of 153 parts of 5-methoxy-2-tetralone in 1700 parts of methyl alcohol containing 134 parts of methyl vinyl ketone is added with agitation at less than 25° under nitrogen atmosphere a solution of 2 parts of metallic sodium in 350 parts of methyl alcohol. The reaction mixture is allowed to stand for 20 hours at room temperature, then poured into 2600 parts of water containing 45 parts of glacial acetic acid. The mixture thus produced contains an organic phase which is removed by extraction into chloroform. The chloroform extract in turn is washed with water, dried over anhydrous sodium sulfate, and finally stripped of solvent by distillation. Resolution and purification of the residue is accomplished by chromatographic absorption on silica gel, using 30% ethyl acetate-70% benzene as developing solvent. Two crystalline products are obtained. The first, hereinbefore referred to as compound III, shows M.P. 224–225° and analyzes 76.67% carbon and 7.43% hydrogen. Dissolved (1%) in methyl alcohol solution, this material shows ultraviolet absorption bands of maximum intensity at 223 and 242 mμ; incorporated in a potassium bromide disc, the material exhibits principal infrared absorption peaks at 2.83, 6.04, 6.17, 6.35, 6.82, 6.95, and 7.92μ. The complete infrared absorption spectrum of this substance is reproduced as FIGURE 1 of the drawings which are a part of this specification.

The second product obtained by the processes of the present example shows M.P. 198–201° and analyzes 76.48% carbon and 7.38% hydrogen. It manifests ultraviolet absorption bands at 231 and 242 mμ when dissolved (1%) in methyl alcohol and, incorporated in potassium bromide, displays principal infrared absorption peaks at 2.97, 6.00, 6.14, 6.35, 6.87, 6.99, and 7.88μ. The complete infrared absorption spectrum of this product is shown at FIGURE 2 of the attached drawings. The material will be recognized as that arbitrarily designated compound IV in the general disclosure preceding this example.

*Example 2*

A mixture of 5 parts of either of the products of the foregoing Example 1 with 1 part of potassium acid sulfate is heated for 15 minutes at approximately 225°. The mixture is cooled, then triturated with water, and finally extracted with benzene. The benzene extract, washed with water and subsequently dried over sodium sulfate, is chromatographed on silica gel, using 5% ethyl acetate-95% benzene as developing solvent. The product obtained is the one hereinbefore referred to as compound X. It shows M.P. 178–180° and analyzes 81.20% carbon and 7.05% hydrogen. A 1% solution of the substance in methyl alcohol shows an ultraviolet absorption band of maximum intensity at 230 mμ, with an extinction coefficient of 20,600. Incorporated in a potassium bromide disc, the material displays principal infrared absorption peaks at 6.00, 6.14, 6.34, 6.84, 6.91, 7.00, and 7.91μ. The complete infrared absorption spectrum of this material is reproduced as FIGURE 3 of the attached drawings.

*Example 3*

A solution of 2 parts of either of the products of Example 1 in 50 parts of ethyl alcohol is heated at reflux temperatures for 15 minutes with a solution of 1 part of sodium borohydride in 15 parts of ethyl alcohol. Acetic acid is then added to stop the reaction, and the mixture is evaporated to dryness. The residue is extracted with benzene and the benzene extract thereupon stripped of solvent in a stream of air. The residue is then heated at 200–300° with 1 part of 5% palladium on charcoal for 15 minutes. Extraction into benzene, followed by evaporation of solvent, yields a highly fluorescent oil which, chromatographed on silica gel using benzene as developing solvent, affords in good yield 1-methoxyphenanthrene, M.P. 100–102°.

A solution of 1 part of the product thus obtained and 2 parts of picric acid in 30 parts of boiling ethyl alcohol, upon cooling, precipitates the picrate, M.P. 152–154°.

*Example 4*

To 472 parts of 5-methoxy-2-tetralone dissolved in 790 parts of methyl alcohol is added 216 parts of methyl iodide dissolved in a cooled solution of 214 parts of 1-diethylamino-3-butanone in 790 parts of methyl alcohol. The solution thus obtained is cooled to about 5°, whereupon a solution of 35 parts of metallic sodium in 790 parts of methyl alcohol is very slowly added thereto with agitation under an atmosphere of nitrogen. The reaction mixture is allowed to stand at room temperatures for 2 hours, then heated with agitation at reflux temperatures for an additional hour. The reactants are next poured into 4,000 parts of ice water containing 168 parts of glacial acetic acid. An oil is produced which is extracted from the aqueous phase with chloroform. The chloroform extract, washed with water, and then dried over anhydrous sodium sulfate, is stripped of solvent by distillation. The residue thus obtained, an oil, is subjected to vacuum distillation. Material boiling at 170–171° under 0.15 mm. pressure is crystallized from 1,265 parts of methyl alcohol to give 1,2,3,4,9,10-hexahydro-8-methoxy-2-oxophenanthrene, M.P. 109–112°. Dissolved (1%) in methyl alcohol, it shows an ultraviolet absorption band at 267 mμ, with an extinction coefficient of 10,600; incorporated in a potassium bromide disc, infrared absorption bands at 5.83, 6.03, 6.30, 6.36, 6.86, 6.94, 7.22, 7.43, 7.56, 7.68, 7.82, 7.95, 8.27, 8.40, 8.50, 8.66, 8.91, 9.19, 9.37, 9.68, 9.82, 9.99, 10.12, 11.45, 11.70, 12.19, 12.71, 12.81, and 13.78μ are observed. This material will be recognized as that hereinbefore designated compound V.

By evaporating the mother liquors from the above crystallization to dryness and chromatographing the residue on silica gel, there is obtained an additional crop of 1,2,3,4,9,10-hexahydro-8-methoxy-2-oxophenanthrene, plus also 2,3,4,4a,9,10-hexahydro - 8 - methoxy - 2 - oxophenanthrene, M.P. 120–122°. The latter material will be recognized as compound VII of the foregoing disclosure. A 1% solution of the substance in methyl alcohol shows an ultraviolet absorption band at 230 mμ, with an extinction coefficient of 19,050; incorporated in a potassium bromide disc, the substance displays infrared absorption peaks at 6.02, 6.17, 6.33, 6.86, 6.98, 7.05, 7.37, 7.53, 7.68, 7.91, 8.00, 8.20, 8.46, 8.76, 9.03, 9.19, 9.45, 9.72, 10.02, 10.39, 10.46, 10.72, 11.26, 11.50, 11.69, 12.30, 12.63, 13.00, 13.68, and 14.17μ.

A forerun in the distillation above, boiling at 135–150° under 0.25 mm. pressure, consists essentially of unreacted starting ketone.

*Example 5*

To a suspension of 20 parts of 1,2,3,4,9,10-hexahydro-8-methoxy-2-oxophenanthrene in 200 parts of methyl alcohol at about 5° under an atmosphere of nitrogen is added with agitation 5 parts of methyl vinyl ketone, followed immediately by a solution of 25 parts of metallic sodium in 600 parts of methyl alcohol. The reaction mixture is then allowed to warm to room temperatures and stand thereat overnight, after which it is poured into 1,000 parts of water containing 120 parts of concentrated muriatic acid. An ether extraction is carried out and the extract washed with water, dried over anhydrous sodium sulfate, and stripped of solvent by vacuum distillation, in that order. The residue, chromatographed on silica gel using 10% ethyl acetate-90% benzene as developing solvent, affords pure 7-methoxy-2,3,4,4a,5,6,11,12-octahydro-2-oxochrysene which, crystallized from methyl alcohol, shows M.P. 164–165°. Dissolved (1%) in methyl alcohol, it shows ultraviolet absorption bands at 229 and 264 mμ, with extinction coefficients of 37,600 and 15,400, respectively; incorporated in a potassium bromide disc, infrared absorption bands at 6.00, 6.11, 6.26, 6.30, 6.38, 6.83, 6.98, 7.10, 7.40, 7.45, 7.50, 7.63, 7.82, 7.91, 7.96, 8.19, 8.31, 8.46, 8.61, 8.70, 8.85, 9.17, 9.28, 9.41, 9.70, 9.92, 10.15, 11.28, 11.48, 11.70, 12.32, 12.71, 12.83, 13.32, 13.58, and 14.08μ are observed. This material will be recognized as that referred to as compound VI in the foregoing disclosure.

What is claimed is:
1. A compound selected from the group consisting of (a) a compound of empirical formula, $C_{19}H_{22}O_3$, characterized by a melting point of about 224–225° C.; ultraviolet absorption bands at 223 and 242 mμ when dissolved in methyl alcohol; infrared absorption bands at 2.83, 6.04, 6.17, 6.35, 6.82, 6.95, 7.29, 7.35, 7.59, 7.69, 7.92, 8.01, 8.30, 8.65, 9.05, 9.20, 9.53, 9.71, 9.92, 10.30, 10.74, 10.90, 11.00, 11.28, 11.50, 11.63, 12.18, 12.56,

12.83, 13.59, 13.82, and 14.43µ when incorporated in a potassium bromide disc, substantially as shown in FIG. 1; ready solubility in each of benzene, toluene, and glacial acetic acid; slight solubility in each of ethyl acetate, methyl alcohol, and ethyl alcohol; and substantial insolubility in each of water, dilute aqueous mineral acid, dilute aqueous alkali, normal hexane, and cyclohexane; (b) a compound of empirical formula, $C_{19}H_{22}O_3$, characterized by a melting point of about 198–201° C.; ultraviolet absorption bands at 231 and 242 mµ when dissolved in methyl alcohol; infrared absorption bands at 2.97, 6.00, 6.14, 6.35, 6.87, 6.99, 7.10, 7.31, 7.41, 7.51, 7.60, 7.88, 8.03, 8.33, 8.62, 9.06, 9.17, 9.58, 9.90, 10.20, 10.75, 10.85, 10.95, 11.43, 11.60, 12.21, 13.05, 13.50, 14.00, and 14.50µ when incorporated in a potassium bromide disc, substantially as shown in FIG. 2; ready solubility in each of benzene, toluene, and glacial acetic acid; slight solubility in each of ethyl acetate, methyl alcohol, and ethyl alcohol; and substantial insolubility in each of water, dilute aqueous mineral acid, dilute aqueous alkali, normal hexane, and cyclohexane; and (c) a compound of empirical formula, $C_{19}H_{20}O_2$, characterized by a melting point of about 178–180° C.; an ultraviolet absorption band at 230 mµ when dissolved in methyl alcohol; infrared absorption bands at 6.00, 6.14, 6.30, 6.34, 6.84, 6.91, 7.00, 7.28, 7.32, 7.42, 7.53, 7.58, 7.65, 7.91, 8.04, 8.19, 8.29, 8.49, 8.56, 8.72, 8.91, 9.19, 9.28, 9.52, 9.68, 9.97, 10.18, 10.38, 10.72, 10.84, 11.39, 11.52, 11.75, 11.97, 12.58, 12.77, 13.36, 13.72, and 14.12µ when incorporated in a potassium bromide disc, substantially as shown in FIG. 3; ready solubility in each of benzene, toluene, and glacial acetic acid; slight solubility in each of ethyl acetate, methyl alcohol, and ethyl alcohol; and substantial insolubility in each of water, dilute aqueous mineral acid, dilute aqueous alkali, normal hexane, and cyclohexane.

2. A compound of empirical formula, $C_{19}H_{22}O_3$, characterized by a melting point of about 224–225° C.; ultraviolet absorption bands at 223 and 242 mµ when dissolved in methyl alcohol; infrared absorption bands at 2.83, 6.04, 6.17, 6.35, 6.82, 6.95, 7.29, 7.35, 7.59, 7.69, 7.92, 8.01, 8.30, 8.65, 9.05, 9.20, 9.53, 9.71, 9.92, 10.30, 10.74, 10.90, 11.00, 11.28, 11.50, 11.63, 12.18, 12.56, 12.83, 13.59, 13.82, and 14.43µ when incorporated in a potassium bromide disc, substantially as shown in FIG. 1; ready solubility in each of benzene, toluene, and glacial acetic acid; slight solubility in each of ethyl acetate, methyl alcohol, and ethyl alcohol; and substantial insolubility in each of water, dilute aqueous mineral acid, dilute aqueous alkali, normal hexane, and cyclohexane.

3. A compound of empirical formula, $C_{19}H_{22}O_3$, characterized by a melting point of about 198–201° C.; ultraviolet absorption bands at 231 and 242 mµ when dissolved in methyl alcohol; infrared absorption bands at 2.97, 6.00, 6.14, 6.35, 6.87, 6.99, 7.10, 7.31, 7.41, 7.51, 7.60, 7.88, 8.03, 8.33, 8.62, 9.06, 9.17, 9.58, 9.90, 10.20, 10.75, 10.85, 10.95, 11.43, 11.60, 12.21, 13.05, 13.50, 14.00, and 14.50µ when incorporated in a potassium bromide disc, substantially as shown in FIG. 2; ready solubility in each of benzene, toluene, and glacial acetic acid; slight solubility in each of ethyl acetate, methyl alcohol, and ethyl alcohol; and substantial insolubility in each of water, dilute aqueous mineral acid, dilute aqueous alkali, normal hexane, and cyclohexane.

4. A compound of empirical formula, $C_{19}H_{20}O_2$, characterized by a melting point of about 178–180° C.; an ultraviolet absorption band at 230 mµ when dissolved in methyl alcohol; infrared absorption bands at 6.00, 6.14, 6.30, 6.34, 6.84, 6.91, 7.00, 7.28, 7.32, 7.42, 7.53, 7.58, 7.65, 7.91, 8.04, 8.19, 8.29, 8.49, 8.56, 8.72, 8.91, 9.19, 9.28, 9.52, 9.68, 9.97, 10.18, 10.38, 10.72, 10.84, 11.39, 11.52, 11.75, 11.97, 12.58, 12.77, 13.36, 13.72, and 14.12µ when incorporated in a potassium bromide disc, substantially as shown in FIG. 3; ready solubility in each of benzene, toluene, and glacial acetic acid; slight solubility in each of ethyl acetate, methyl alcohol, and ethyl alcohol; and substantial insolubility in each of water, dilute aqueous mineral acid, dilute aqueous alkali, normal hexane, and cyclohexane.

References Cited in the file of this patent

Cornforth et al.: J. Chem. Soc. (London) 1949, page 1856.

Johnson et al.: J. Am. Chem. Soc., vol. 75, page 2275 (1953).